United States Patent [19]

Yates

[15] 3,649,310

[45] Mar. 14, 1972

[54] DENSE, SUBMICRON GRAIN ALN-SIC BODIES

[72] Inventor: Paul C. Yates, 2120 Shipley Road, Oak Lane Manor, Wilmington, Del. 19803

[22] Filed: Oct. 25, 1968

[21] Appl. No.: 770,790

[52] U.S. Cl. ................................106/44, 29/182.7, 23/208, 75/203, 75/205, 106/43, 264/29
[51] Int. Cl. .............................................C04b 35/14
[58] Field of Search ............106/44, 43, 55; 29/182.7, 182.5; 264/29, 65; 75/10, 206, 226, 203, 205; 23/208, 209.2

[56] References Cited

UNITED STATES PATENTS

| | | | |
|---|---|---|---|
| 2,636,825 | 4/1953 | Nicholson | 106/44 |
| 2,931,719 | 4/1960 | Menegoz et al. | 75/10 |
| 3,035,325 | 5/1962 | Nicholson et al. | 106/44 X |
| 3,175,884 | 3/1965 | Kuhn | 23/208 |
| 3,194,635 | 7/1965 | Lapp et al. | 106/44 X |
| 3,259,509 | 7/1966 | Matkovich | 106/65 |
| 3,492,153 | 1/1970 | Ervin | 106/44 X |
| 3,379,523 | 4/1968 | Chaklader | 75/206 |
| 3,472,709 | 10/1969 | Quatinetz et al. | 75/226 |
| 3,514,271 | 5/1970 | Yates | 29/182.5 |

OTHER PUBLICATIONS

Alliegro, et al., Pressure-Sintered Silicon Carbide, in Jour. Amer. Cer. Soc., 39 (1956) pp. 386– 389

Primary Examiner—James E. Poer
Assistant Examiner—W. R. Satterfield
Attorney—John R. Powell

[57] ABSTRACT

Compositions consisting essentially of a dense solid body comprising silicon carbide and aluminum nitride, and optionally other refractory materials, and processes for making same, are disclosed. These bodies are submicron grain particles homogeneously interspersed and bonded to one another in which the individual components retain their identity and X-ray diffraction patterns. The compositions are useful as abrasive grits, heating elements, cutting tools, and the like.

11 Claims, No Drawings

DENSE, SUBMICRON GRAIN ALN-SIC BODIES

DESCRIPTION OF THE INVENTION

The instant invention relates to compositions consisting essentially of a dense, solid body comprising submicron grain particles of silicon carbide (SiC) and aluminum nitride (AlN) homogeneously interspersed and bonded to one another in which the individual components retain (1) their identity and (2) their individual X-ray diffraction patterns. The compositions have high strengths. The invention also relates to methods for preparing the above-mentioned compositions.

The proportions of silicon carbide and aluminum nitride can be varied over a relatively broad range. In order to obtain the compositions according to this invention, however, it is necessary that the silicon carbide constitute at least 10 percent of by weight the compositions and that the aluminum nitride likewise constitute at least 10 percent by weight of the composition. The ratio of silicon carbide to aluminum nitride may vary between 9:1 to 1:9. The composition may, in addition to silicon carbide and aluminum nitride, contain other hard, refractory, abrasion-resistant materials which are chemically compatible and stable in the presence of silicon carbide and aluminum nitride. Examples of such materials are boron carbide ($B_4C$), alumina ($Al_2O_3$), silicon nitride ($Si_3N_4$), and the like.

The compositions of this invention are prepared by a chemical reaction between aluminum carbide ($Al_4C_3$) and silicon nitride ($Si_3N_4$). It is a unique feature of this invention that when aluminum carbide and silicon nitride are placed together, pressed, and heated, a metathesis reaction occurs between them to form submicron grain bodies according to the equation:

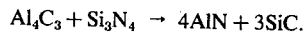

$$Al_4C_3 + Si_3N_4 \rightarrow 4AlN + 3SiC.$$

As a result of this reaction, aluminum nitride and silicon carbide are bonded to one another as well as to particles of the same type.

The term "submicron grain" means that the number average grain size is less than 1 micron. The number average is determined for any given sample according to the method described in Hiliard, Metal Progress, pages 99—100 (May, 1964).

It must be noted that if efforts are made to "hot press" either aluminum nitride or silicon carbide on an individual basis, neither can be satisfactorily pressed to theoretical density, even at temperatures as high as 2,200° C. Apparently, there is a state of plasticity achieved during the process of metathesis by which the compositions of the invention are formed which allows both of these exceedingly nondeformable materials to be deformed and to thereby achieve substantially theoretically dense, strong, bodies.

Satisfactory compositions can be obtained by (1) ballmilling the reactants in the presence of an inert solvent, such as hexane, "Soltrol", kerosene, and the like; (2) cold pressing; and (3) heating within a temperature range of between 1,600 to 2,200° C. The preferred manner of making the compositions, however, is to simultaneously apply pressure and temperature. While a temperature range of 1,600° C. to 2,200° C. has been found operable, temperatures in the range of 1,700° to 2,000° C. are preferred because undesirably long pressing times are required at lower temperatures while excessive grain growth may take place near the upper temperature limits. During the pressing steps between 200 p.s.i. to 6,000 p.s.i. is applied to the reactants. The time required to fabricate the compositions will vary depending upon the technique of fabrication. In the case of simultaneous heating and pressing, the time will vary between a matter of a few seconds (10–15 sec.) to perhaps as long as 10 to 15 minutes. In general, the higher the temperature, the shorter will be the reaction time necessary to prepare the compositions.

It is preferred to use stoichiometrically equivalent amounts of aluminum carbide and silicon nitride when preparing the compositions of this invention. The use of such amounts will result in a composition having 4 moles of aluminum nitride and 3 moles of silicon carbide, which on a weight basis corresponds to 57.6 percent aluminum nitride and 42.4 percent silicon carbide.

As discussed above, it is possible to utilize the reactive hot pressing densification process to prepare compositions having other than equimolar proportions. This may be accomplished by adding submicron grain aluminum nitride or silicon carbide particles to the stoichiometric reaction mixture. The only critical feature is that at least 20 percent by weight of the total reaction mixture must consist of aluminum carbide and silicon nitride. This quantity of material imparts sufficient plasticity during the reactive hot pressing step to allow the compositions of the invention to be fabricated into dense bodies. When materials such as silicon nitride are introduced in quantities exceeding those required by the stoichiometric reaction, the resultant refractory body will be a ternary body consisting of aluminum nitride, silicon carbide, and silicon nitride. Other hard, refractory materials which are compatible with silicon carbide and aluminum nitride at very high temperatures may also be added.

The following examples illustrate the preparation of the compositions of this invention.

EXAMPLE 1

Ten and fourteen one hundreds grams of commercial aluminum carbide ($Al_4C_3$ containing 24.8 percent carbon and 2.5 percent oxygen; having a surface area of 2.0 m²/gm.; and containing by emission spectograph less than 1.0 percent of silicon, iron, and chromium) and 9.86 grams of silicon nitride ($Si_3N_4$ minus 325 mesh powder, having 59.4 percent silicon, 0.03 percent oxygen, and the balance nitrogen except for impurities which are 2 percent iron, 1 percent aluminum, and 1 percent calcium) are ballmilled for three days in a one quart ballmill suspended in a high boiling point hydrocarbon oil, "Soltrol" 130, a distillation fraction containing mainly aliphatic hydrocarbons and having a flash point of 54.5° C., and recovered by filtering under an inert atmosphere and washing with hexane until all of the high-boiling hydrocarbon oil is eliminated. The product is then dried under nitrogen to remove the hexane and is hot pressed in a graphite mold while employing an induction heated furnace under vacuum. The pressing procedure is to load the mixed powder into the graphite mold and insert close fitting graphite pistons in each end; increase the temperature to 1,600° C.; apply a pressure of 4,000 p.s.i.; increase the temperature to 2,000° C.; hold until all relative motion of the pistons has ceased and hold thereafter for five additional minutes at this temperature; and cool. The resulting product (1) has a density of 3.26 (which is theoretical density for this composition); (2) shows by electron micrograph replication a submicron grained structure consisting of approximately equal amounts of homogeneously intermixed particles of aluminum nitride and silicon carbide (the average grain size of silicon carbide and aluminum nitride crystals is less than 1 micron as determined by the above-mentioned reference in Metal Progress); and (3) gives an X-ray diffraction pattern indicating approximately equivalent amounts of both these species. The transverse rupture strength of this material is 100,000 p.s.i., the Rockwell A hardness is about 94, and the impact strength is about 4 lbs. per square inch.

EXAMPLE 2

16 grams of aluminum nitride, 2.03 grams of aluminum carbide and 1.97 grams of silicon nitride are ballmilled as in Example 1 and the powders recovered in the same fashion. The hot pressing procedure employed in also the same as in Example 1. The product obtained is a dense body containing about 90 percent aluminum nitride and 10 percent silicon carbide, showing a submicron grained structure with discrete grains of both phases evident both in electron micrograph replica and as determined by X-ray analysis. The transverse rupture strength of this body is approximately 90,000 p.s.i., the Knoop hardness (using a 1,000 gram load) is 1,800. The product is an excellent abrasive grit material, particularly for grinding high speed steels. It is prepared in the form of an abrasive grit by crushing it to the required grit size in a mechanical crusher and sieving.

EXAMPLE 3

Two and three one hundreds grams of aluminum carbide, 11.97 grams of silicon nitride, and 5 grams of a submicron grained powder of silicon carbide are ballmilled as in the previous two examples. The hot pressing procedure employed is identical with that of Example 1. The resulting dense, submicron grained body contains 50 percent silicon nitride, 40 percent silicon carbide, and 10 percent aluminum nitride. Again the presence of the two primary phases of the invention, along with the silicon nitride phase is clearly evident in the microstructure and by X-ray analysis. This material is an exceptional heating element showing a higher electrical resistance than silicon carbide, as well as excellent strength and temperature resistance when employed as a high temperature structural material.

EXAMPLE 4

Two and three one hundreds grams of aluminum carbide, 1.97 grams of silicon nitride, 10.0 grams of a submicron grained particle size aluminum nitride, 6.0 grams of a finely divided amorphous boron, and 2.85 grams of a fired high surface area carbon black are ballmilled, recovered, and pressed as in previous examples. The resulting body contains approximately 56 percent aluminum nitride, 10 percent silicon carbide, and 40 percent boron carbide. This material is exceptionally strong and exhibits excellent abrasion resistance in wear resistance applications.

UTILITY OF THE COMPOSITIONS

The products of the invention are useful as refractory abrasive grits. It was known in the past, that although silicon carbide was a highly useful material in the abrasives industry, it had an undesirable tendency to react chemically with steel, particularly if the abrasive grinding reactions were conducted at very high speeds. It has now been found that this tendency toward undesirable chemical reaction is decreased in proportion to the quantity of aluminum nitride present. The toughness of these materials is also greater than the toughness of silicon carbide prepared by prior art techniques. The submicron grain structure, characteristic of the products of the invention, makes them more difficult to fracture than previously known silicon carbide materials. Thus, the compositions of this invention are exceptionally useful for heavy cuts on steels at high speeds.

The compositions of the invention are also useful as heating elements. In particular, it has been found that the oxidation resistance compares favorably with pure silicon carbide heating elements, whereas the strength and mechanical properties are considerably better than those heating elements which have been prepared by prior art techniques. This is due to the fact that the high-temperature mechanical strength of the products of this invention are more than twice as great as that of even the best grade of silicon carbide commercially available.

In addition, it is possible to vary the resistance characteristics of the compositions of this invention by changing the relative proportions of aluminum nitride to silicon carbide. Aluminum nitride has an exceedingly high-electrical resistance even at elevated temperatures, whereas silicon carbide is an excellent conductor and semiconductor. Thus, by adjusting the proportions of these two materials it is possible to achieve any desired degree of electrical resistance.

The compositions of this invention are also useful as cutting tools, where the high hardness, mechanical strength, and toughness imparted by the submicron grain structure are particularly advantageous. In general, they are most useful when cutting lower melting metals such as copper, brass, bronze, aluminum, and the like. If it is desired to employ the compositions of this invention in cutting steels, a composition should be selected having a relatively large quantity of aluminum nitride, such as the upper limiting compositions containing 90 percent aluminum nitride and 10 percent silicon carbide.

The compositions of this invention are also useful as heat-resistant, abrasion-resistant, corrosion-resistant, and oxidation-resistant structural materials. Their combination of high-strength, excellent thermal shock resistance, low coefficient of thermal expansion, excellent oxidation resistance, and outstanding resistance to molten metals and salts, and to many other corrosive chemicals makes them very well suited to such applications. The relative ease of fabrication and the relatively low cost of the raw materials from which they are prepared are also factors in contributing to their utility in such applications.

The compositions of this invention are particularly useful in handling molten aluminum as well as other low-melting metals in applications like investment die casting, and as conduits or holding tanks for such materials. The ability to vary electrical conductivity and thermal conductivity by varying the relative proportions of aluminum nitride to silicon carbide imparts a degree of flexibility which has hitherto not been attained using silicon carbide alone. Furthermore, the ease of fabrication and the low cost of the starting materials again lend themselves to the type of application just discussed.

I claim:

1. A solid body of substantially theoretical density, formed by metathesis reaction between aluminum carbide and silicon nitride, consisting essentially of 10 to 90 percent by weight silicon carbide, 10 to 90 percent by weight aluminum nitride, and 0 to 80 percent by weight of at least one other hard, refractory, abrasion-resistant material selected from the group consisting of boron carbide, alumina, and silicon nitride, the components being present as discrete, homogeneously intermixed, bonded particles, the body being characterized in that it exhibits X-ray diffraction patterns of both an aluminum nitride phase and a silicon carbide phase, and in that the particles of both the aluminum nitride phase and the silicon carbide phase are submicron grain particles.

2. A solid body of claim 1 consisting essentially of silicon carbide, aluminum nitride, and boron carbide.

3. A solid body of claim 1 consisting essentially of silicon carbide, aluminum nitride and silicon nitride.

4. A solid body of claim 1 wherein the aluminum nitride and silicon carbide are present in the approximate molar ratio 4AlN:3SiC.

5. A solid body of claim 1 consisting essentially of silicon carbide, aluminum nitride, and alumina.

6. A process for preparing a solid body of claim 1 comprising pressing, at a pressure between about 200 and 6,000 p.s.i., and heating, at a temperature between about 1,600° and 200° C., a homogeneous mixture of aluminum carbide particles and silicon nitride particles, optionally containing particles of at least one other hard, refractory, abrasion-resistant material selected from the group consisting of boron carbide, aluminum nitride, and alumina, or particles of substances which react during the heating step to provide such a material, whereby a metathesis reaction between said aluminum carbide and silicon nitride occurs to produce a submicron-grained aluminum nitride phase and a submicron-grained silicon carbide phase, and the body reaches substantially theoretical density.

7. A process of claim 6 wherein the heating and pressing are carried out simultaneously.

8. A process of claim 7 wherein the mixture consists essentially of aluminum carbide and silicon nitride.

9. The process of claim 7 wherein the mixture consists essentially of aluminum carbide, silicon nitride, and submicron grain aluminum nitride.

10. The process of claim 7 wherein the mixture consists essentially of aluminum carbide, silicon nitride, boron, and carbon.

11. The process of claim 7 where the aluminum carbide and silicon nitride are present in the mixture in approximately equimolar amounts, whereby the resulting body contains aluminum nitride and silicon carbide in the approximate molar ratio 4AlN:3SiC.

* * * * *

PO-1050
(5/69)

UNITED STATES PATENT OFFICE
CERTIFICATE OF CORRECTION

Patent No. 3,649,310     Dated March 14, 1972

Inventor(s) Paul C. Yates

It is certified that error appears in the above-identified patent and that said Letters Patent are hereby corrected as shown below:

Column 4:
Claim 6, line 3 "200°" should be -- 2200° --.

Signed and sealed this 26th day of September 1972.

(SEAL)
Attest:

EDWARD M. FLETCHER, JR.
Attesting Officer

ROBERT GOTTSCHALK
Commissioner of Patents